United States Patent [19]
Kruyer

[11] Patent Number: 4,744,889
[45] Date of Patent: May 17, 1988

[54] SEPARATION OF VISCOUS HYDROCARBONS AND MINERALS PARTICLES FROM AQUEOUS MIXTURES BY MIXTURES BY OLEOPHILIC ADHESION

[76] Inventor: Jan Kruyer, 9707 67A Street, Edmonton, Canada

[21] Appl. No.: 849,546

[22] Filed: Apr. 8, 1986

Related U.S. Application Data

[63] Continuation-in-part of Ser. No. 722,318, Apr. 12, 1985, abandoned.

[51] Int. Cl.⁴ .......................... B03B 1/00; C10G 1/00; B01D 15/00
[52] U.S. Cl. ...................................... 209/9; 208/391; 209/49; 210/267; 210/283; 210/671; 210/691; 210/693; 210/DIG. 5
[58] Field of Search ........................ 209/3–5, 209/9, 45–47, 49, 59, 61, 62; 208/391, 425, 426; 210/267, 283, 397, 403, 669, 671, 680, 691, 693, DIG. 5; 241/24, 70–74, 171

[56] References Cited

U.S. PATENT DOCUMENTS

| | | | |
|---|---|---|---|
| 443,737 | 12/1890 | Anderson | 210/267 |
| 1,412,673 | 4/1922 | Burgess | 209/62 |
| 1,458,467 | 6/1923 | Dolbear | 209/49 X |
| 2,189,124 | 2/1940 | Bierbrauer | 209/49 |
| 3,231,091 | 1/1966 | Kingsbury et al. | 210/DIG. 5 X |
| 3,399,765 | 9/1968 | Puddington et al. | 208/391 X |
| 3,478,873 | 11/1969 | McLean | 210/671 |
| 3,617,556 | 11/1971 | Cole et al. | 210/671 |
| 3,976,570 | 8/1976 | McCray | 210/693 X |
| 3,979,289 | 9/1976 | Bykowski et al. | 210/403 X |
| 4,224,138 | 9/1980 | Kruyer | 208/391 |
| 4,236,995 | 12/1980 | Kruyer | 208/391 |
| 4,511,461 | 4/1985 | Kruyer | 209/49 X |

FOREIGN PATENT DOCUMENTS

0016760 7/1903 United Kingdom ................ 210/267

Primary Examiner—Robert B. Reeves
Assistant Examiner—Edward M. Wacyra
Attorney, Agent, or Firm—Thorpe, North & Western

[57] ABSTRACT

A method and apparatus for separating an oil phase from an aqueous phase by means of a rotating drum apparatus containing one or more compartments, each being partially filled with oleophilic free bodies. When containing two or more compartments, they are separated by an apertured baffle. The interior surfaces of the drum are oleophilic and the portion of the drum sidewall, where the mixture is removed is apertured. Due to the oleophilic free bodies and interior oleophilic surfaces, the aqueous phase velocity through the drum is faster than the oil phase which adheres to the oleophilic surfaces causing an in situ buildup and agglomeration of oil phase in the drum. The mixture exiting the apertured drum sidewall is partitioned by the tumbling free bodies, oleophilic drum surfaces and drum rotation such that aqueous phase leaves the drum between the 6 and 9 o'clock positions of counter clockwise rotation where free body concentration is minimal. The oil phase is carried with the free bodies as the drum rotates and is extruded through the apertures to the outside of the drum between the 3 and 6 o'clock positions where free body concentration is greatest. A scraper or an endless oleophilic belt partly wrapped around the apertured portion of the drum remove the extruded oil phase from the drum surface. The endless belt may be a woven mesh made of plastic or metal or may be a metal belt of joined flattened spiral metal strands.

80 Claims, 3 Drawing Sheets

SEPARATION OF VISCOUS HYDROCARBONS AND MINERALS PARTICLES FROM AQUEOUS MIXTURES BY MIXTURES BY OLEOPHILIC ADHESION

BACKGROUND OF THE INVENTION

This application is a continuation-in-part of Ser. No. 722,318 filed Apr. 12, 1985 and now abandoned.

This invention relates to a process and apparatus for the recovery of viscous hydrocarbons and oleophilic surfaced mineral particles from an aqueous mixture containing the same. More particularly, this invention relates to a process and apparatus for the recovery of viscous hydrocarbons and oleophilic surfaced mineral particles from aqueous mixtures which may also contain hydrophilic solids by means of a process and apparatus wherein the flow of the viscous hydrocarbons and mineral particles through a recovery apparatus is slowed relative to the flow of the aqueous phase and wherein the recovery of viscous hydrocarbon and mineral particles from said aqueous phase is accomplished such that the aqueous phase and hydrocarbon phases are caused to exit the apparatus in different quadrants of apparatus rotation.

The use of oleophilic adhesion techniques for recovering bitumen from mined tar sands, for recovering other viscous hydrocarbons from aqueous mixtures, and for recovering oleophilic surfaced mineral particles is documented in the art.

The art that appears to relate most closely to the present invention is U.S. Pat. Nos. 3,399,765 Puddington et al.; 4,236,995 Kryer (I); 4,406,793 Kruyer (II), and 4,511,461 Kruyer (III).

Puddington et al teach the treatment of viscous organic materials and hydrophilic solids in an aqueous medium in a milling apparatus in which the milling objects have hydrophilic surfaces. Milling objects normally are objects in a mill used to actually decrease the particle size of the mixture. Alternately, Puddington et al teach the recovery of oil phase from a mixture by making the internal periphery of the mill oleophilic, causing the oil phase to accumulate on the inside of the mill as an adhering layer which can be removed by a scraper.

Kruyer(I) teaches the use of an oleophilic apertured drum to separate bitumen from mined oil and/or tar sands. The drum is immersed in a bath and the mixture to be separated is introduced into the immersed part of the drum to achieve the separation. The oil phase adheres to the apertured wall as it emerges out of the aqueous phase of the bath and is then removed from the oleophilic apertured wall by means of a transfer roller and a recovery roller.

Kruyer(II) teaches the use of oleophilic free bodies in a rotating drum to increase the particle size of dispersed oil phase in a continuous aqueous phase. Kruyer(II) uses similar oleophilic free bodies as in the present invention, however, they are used to prepare a mixture for subsequent separation in a separate apparatus and there is no teaching of a method of holding up the flow of oil phase in the drum relative to the aqueous phase.

Kruyer(III), which issued from a copending application on Apr. 16, 1985, teaches a process for recovering mineral particles by means of oleophilic adhesion. The process taught utilizes a rotating cage which may contain oleophilic free bodies and an oleophilic sieve belt partially wrapped around the cage wall. A slurry containing the mineral particles mixed with gangue enters the rotating cage where the mineral particles are coated with an oleophilic hydrocarbon adhesive and caused to agglomerate by means of contact with the oleophilic free bodies. However, the contact with free bodies is of relatively short duration and there is no suggestion of slowing the flow of mineral particles and hydrocarbon adhesive relative to the gangue and aqueous phase to prolong contact times.

While the above patents do present certain advances in the art, there is no teaching of prolonging contact time between oil phase, with or without mineral particles, and free bodies to increase oil phase particle size. Also, there is no teaching of segregating the agglomerated oil phase from aqueous phase in a separation section of an apparatus brought about by drum rotation and the combined action of oleophilic free bodies with apertured oleophilic drum walls.

There are many different types of viscous hydrocarbon oils and mineral particles which are susceptible to recovery by means of oleophilic adhesion techniques. These include the recovery of bitumen from mined tar sand slurries, tar sand tailings, middlings and tailings pond sludge; viscous hydrocarbons deposited on sands or water surfaces as a result of oil spills; oil and water emulsions created by steam injection into tar sands or heavy oil deposits or other oil recovery techniques; mineral deposits in low grade ores mined dry and mixed with water or dredged materials from streams, lakes beds, river bottoms and the like. In short, any aqueous mixture containing viscous hydrocarbon materials or any particulate mineral materials which can be made to have oleophilic surfaces are subject to treatment and recovery. A more detailed listing of materials to be treated can be found in the above mentioned Kruyer(I), (II) and (III) patents.

OBJECTS OF THE INVENTION

It is an object of the present invention to provide a new and improved oleophilic adhesion process for removing viscous hydrocarbons and mineral particles having oleophilic surfaces from aqueous mixtures.

It is also an object of this invention to provide a process for removing viscous hydrocarbons and mineral particles having oleophilic surfaces by means of a process wherein the flow of hydrocarbons, with or without mineral particles, through the recovery apparatus is slowed relative to the aqueous phase and gangue materials present such that the hydrocarbon particles are captured and allowed to increase in size.

Still another object of the invention is to provide a process for the bringing about the separation of oil phase from aqueous phase when leaving an apertured drum wherein the oil phase leaves the apertured drum section in an area of the drum which is further along the drum in the direction of rotation than where the aqueous phase exits.

Yet another object of the invention is to provide apparatus in which to achieve the above mentioned process objectives.

SUMMARY OF THE INVENTION

The above objects, as well as others not specifically enumerated, can be accomplished by means of a process and rotating drum apparatus providing mixing and contacting means wherein the flow of the more viscous hydrocarbon phase in the rotating drum apparatus is inhibited relative to the less viscous aqueous phase and also providing separation means through apertures in said rotating drum apparatus wherein the more viscous phase leaves said drum through said apertures downsteam in the direction of drum rotation from the point at which the aqueous phase exits through said drum apertures.

In order to better define the apparatus and process, some basic definitions may be beneficial. The product to be separated will involve an aqueous phase and a viscous hydrocarbon phase. If processing an oil spill, there may be very little particulate matter in either phase. However, if treating a mined tar sand or if extracting minerals from an ore deposit, there may be considerable solid particles contained in both the oil and aqueous phases. Hence, the combined oil/aqueous phases will be referred to herein as a "mixture" or "slurry". The term "oil phase" is inclusive of both bitumen or other viscous hydrocarbons and solid mineral particles coated by, suspended in or otherwise held by the viscous oil phase. Similarly, the terms "aqueous phase" and "water phase" are inclusive of water, water soluble ingredients and all solid particulate materials not contained in the oil phase. In other words, hydrophilic materials, including gangue, are considered part of the aqueous phase. The term "inlet" is the point at which the mixture enters the drum and may sometimes be referred to as the "rear" portion of the drum but that may at times be a misnomer if the flow through the drum is radial instead of axial. The terms "outlet" or "exit" are the apertured portions of the drum at which the separated aqueous and oil phases leave the drum. This is sometimes referred to as the "forward" portion. However, this could also be a misnomer if the flow through the drum is radial. The term "axial flow" means flow in the direction of the longitudinal axis of the drum, and perpendicular to the rotational forces of the drum, i.e. from the rear to the front of the drum. The term "radial flow" means flow outwardly from the center or, axis of rotation of the drum, to the circumference thereof. Flow through a drum could also be "axial" and "radial" if the mixture enters the inlet at the rear center of the drum and exits at the front portion of drum circumferential sidewall. The term "lateral baffle" shall mean one or more apertured disks situated in the drum perpendicular to the axis thereof dividing the drum into one or more "lateral compartments". The term "concentric baffle" shall mean one or more apertured cylindrical barriers coaxial with the longitudinal axis of the drum and extending radially outwardly therefrom dividing the drum into "concentric compartments". The term "free bodies" shall mean oleophilic surfaced balls, rods or any other suitable geometric shapes placed inside the lateral or concentric compartments which tumble within the compartments as the drum rotates.

With the above definitions in mind, a summary of the invention follows.

Into the inlet of a rotating drum, as above described, containing two or more lateral or concentric compartments, is introduced the mixture. In other words, there preferably are at least an inlet and an outlet compartment and there may be intervening compartments in between. The rotating of the drum causes the free bodies inside the compartments to tumble and also brings the rotational movement of the mixture within the compartments up to the rotational speed of the drum. The oleophilic free bodies rotating within the compartments cause the more viscous oil phase to move more slowly through the compartments than the less viscous aqueous phase. Not only is viscosity a factor, but also the oleophilic surfaced free bodies cause oil phase particles to adhere to them and by cohesion with each other, grow in size. Also, the mixing of the oil phase particles in the voids between the free bodies causes contact with each other and agglomeration. The interior drum walls and the baffles are also preferably oleophilic and the oil phase particles also adhere to them until forced through the baffle apertures by the tumbling of the free bodies and the force of mixture flow through the drum. The aqueous phase moves through the drum from compartment to compartment more rapidly than the oil phase thereby causing an increase in oil phase concentration in the drum relative to the oil phase contained in the mixture entering the drum. However, a point of equilibrium will be reached wherein the amount of oil phase and water phase entering the drum will equal the amount of separated oil phase and aqueous phase leaving the drum. However, because of the higher in situ oil concentration within the drum, the point velocity of water traversing the drum will be greater than the point velocity of the oil phase passing through the drum.

Once the oil phase has reached the outlet compartment of the drum, it is removed and recovered in a manner which enables it to be separated from the aqueous phase in a different rotational quadrant of the drum. The outlet compartment of the drum contains an apertured exit. If the compartments are lateral, either the forward portion of the circumferential wall or the endwall may be apertured. Or, if desired, both may be apertured. Preferably, the circumferential wall of the drum will be the apertured exit. If the compartments are concentric, the entire circumferential wall of the drum may be apertured.

In either event, the aqueous phase in the outlet or exit compartment, leaves the apertures of the rotating drum in the lower portion of rotation cycle whereas the viscous oil phase is rotated upwards due to it viscosity, its adhesion to the tumbling free bodies, by being trapped in the voids between the free bodies and by adhering to the oleophilic interior drum wall. With the aqueous phase being removed in the bottom vicinity of rotation, it is beneficial to remove the oil phase in another area of drum rotation. The oil phase is forced or extruded through the apertures in the outlet compartment in a particular rotation position, by the force of the flow of both phases through that compartment and the tumbling of the free bodies, to the outside of the drum and is recovered from the outside by oleophilic adhesion means. The outer drum surface may be oleophilic and the adhering oil phase can be scraped off the surface by doctor blades or the like. In the alternative, the oleophilic adhesion means can be two apertured walls in series. The first wall is the apertured drum outlet compartment and the second wall is an endless oleophilic apertured belt partially wrapped around the outlet compartment. The oleophilic apertured belt also serves as the oil phase removal means. If two walls are utilized, the outer sidewall of the outlet compartment does not necessarily have to be oleophilic. The apertured wall of the outlet compartment and, if used, the endless apertured oleophilic belt are referred to as an "oleophilic sieve".

Both aqueous phase and oil phase pass through the oleophilic sieve apertures with the aqueous phase falling away from the drum surfaces readily, while the oil phase flows into and hangs on to the sieve for a longer period of time and falls away or is scraped or otherwise removed from the sieve surfaces further along the drum in the direction of rotation.

When an endless belt is not used, the oil phase is removed from the outer oleophilic sieve surface by various means such as scraping, transfer rollers and the like. When an endless belt is utilized, the oil phase adheres to the belt and is carried away from the rotating drum for removal.

These and other embodiments will be more completely delineated in conjunction with the detailed description and drawings.

DETAILED DESCRIPTION OF THE INVENTION

As used herein, "oleophilic" refers to those surfaces or materials which are attracted to and wettable with oil and "hydrophilic" refers to surfaces or materials which are attracted to and wettable with water. "Viscous oil phase" refers to hydrocarbon or oil phase that has a viscosity, preferably exceeding 100 poises at the process operating temperature. The viscous oil phase may also contain mineral particles as previously described.

As more fully described herein, certain beneficial separation results are obtained when an aqueous mixture containing an oil phase is tumbled in a rotating drum in the presence of oleophilic surfaced free bodies that have a density which is greater than water and wherein the drum is divided into compartments. The exit or outlet compartment is apertured and forms an oleophilic sieve which permits the oil phase and water phase materials of the mixture to leave the drum but prevents the free bodies from leaving. Not only is there a hold up of viscous oil phase throughout the drum compartments in the direction of flow, depending on whether the compartments are lateral or concentric, that is beneficial for the capture of dispersed oil phase particles as the separating mixture flows through the drum, but there is also a hold up of viscous oil phase in the outlet compartment forming the oleophilic sieve portion of the drum in the radial direction of drum rotation with the hold up of viscous oil being beneficial for the purpose of splitting the exiting mixture stream into an aqueous phase rich stream and an oil phase rich stream.

The most beneficial results are as follows:

1. When an aqueous mixture of oil phase and aqueous phase is tumbled in a drum in the presence of oleophilic free bodies that are denser than water, the hydrophilic materials remain part of the aqueous phase and the oleophilic materials begin to concentrate in the oil phase by adhering to the free bodies and filling the voids between the free bodies.

2. When the above described tumbling action is continued for a sufficiently long time, most of the oleophilic materials, including mineral particles, become part of the oil phase and most of the hydrophilic materials remain or become part of the aqueous phase.

3. The aqueous phase, being much less viscous than the oil phase, flows through the drum at a much faster rate than the oil phase resulting in oil phase in situ concentrations in the drum compartments that are much higher than the steady state oil phase concentration of the mixture entering or leaving the drum. The hold up of oil phase in the rotating drum compartments containing oleophilic free bodies is believed to be caused by the oil phase adhering to and collecting in the voids between the tumbling free bodies and flowing through the drum at a much slower rate than the aqueous phase. Depending partly upon the rate of rotation of the drum, this hold-up causes an increase in the oil phase in situ concentration in the drum and causes aqueous phase to flow through the drum much faster than oil phase. The holdup is greatest when the drum is rotating slowly but is large even at higher rotation rates.

4. With the exit or outlet compartment of the drum forming the oleophilic sieve, the oleophilic free bodies in conjunction with the sieve wall cause a segregation of oil phase from aqueous phase radially along the drum circumference in the direction of drum rotation. The oleophilic free bodies tend to settle to the bottom of the drum when the drum rotates very slowly but tend to concentrate more and more in the quadrant defining upward drumwall rotation as the drum rotation is increased. The quadrant defining upward drumwall rotation is the circumferential portion of the drum between the 6 and 3 o'clock positions if the drum is rotating in a counter-clockwise direction, and between the 6 and 9 o'clock position if the drum is rotating in a clockwise direction. The oil phase preferably remains in the voids between the free bodies and hence tends to concentrate in this quadrant as well.

5. The oil phase preferably leaves the drum through the outlet compartment forming the oleophilic sieve adjacent to those portions of the sieve occupied by the oleophilic free bodies in which the voids are partly or completely filled with oil phase, while the aqueous phase preferably leaves through the apertures of the sieve in those portions not occupied by the free bodies or in those portions occupied by free bodies in which the voids are not yet completely filled with oil phase. This results in a segregation in the outlet compartment of aqueous phase from oil phase along the drum periphery in the direction of drum rotation. This is dependent, to some degree, upon the viscosity of the oil phase, the size and density of the free bodies, the size of the sieve apertures, the drum size and the rate of rotation of the drum.

Figure 12:
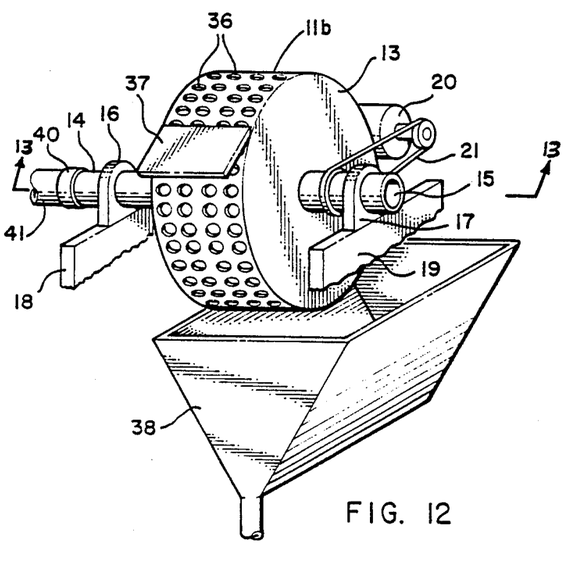
FIG. 12 is a perspective view of another embodiment of the invention showing a drum separator similar to that shown in FIG. 1 but not being divided into compartments.
Figure 13:
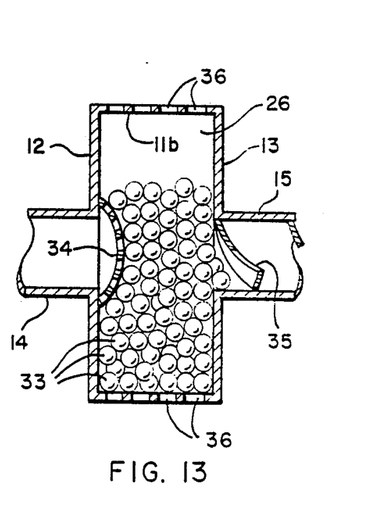
FIG. 13 is a longitudinal cross sectional view of the drum separator only, taken along lines 13—13 of FIG. 12.

One complete embodiment of the invention utilizing a multiple compartment drum is more fully illustrated in FIGS. 1–6. Other equally preferred embodiments are illustrated in FIGS. 7–11. Another embodiment, using a single compartment drum is shown in FIGS. 12 and 13.

Figures 1, 7:
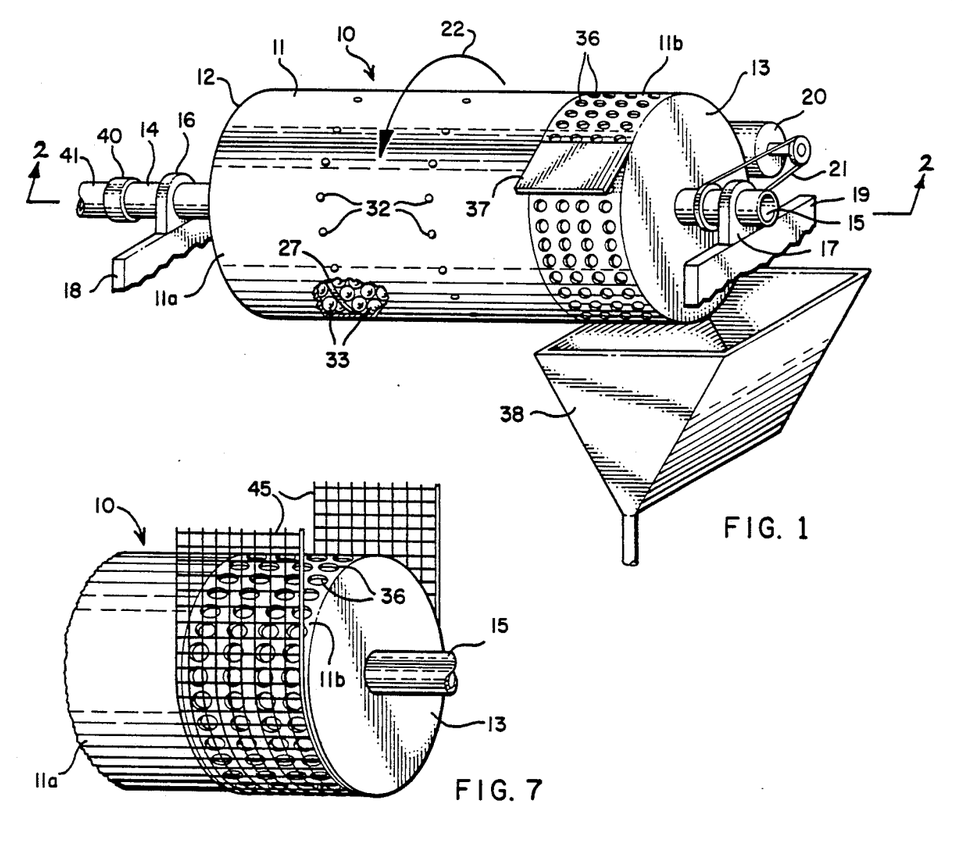
FIG. 1 is a perspective view of one embodiment of the invention showing a drum separator supported on bearings and provided with an inlet, a rotary seal, a drive, an apertured oleophilic sieve outlet, a scraper for oil phase removal and a receptacle for collection of separated oil phase.
FIG. 7 is a fragmented perspective view of a second embodiment of the invention similar to FIG. 1 but showing an apertured oleophilic endless belt partially wrapped around the apertured wall for oil phase removal.

FIG. 1 shows a drum separator 10 mounted in a generally horizontal position and consisting of a cylindrical sidewall 11 divided into a solid sidewall portion 11a and a perforated oleophilic sieve outlet portion 11b and containing a rear endwall 12 (not visible) and a front endwall 13. The endwalls contain central apertures to provide inlet and outlet feed means. The drum is supported by hollow inlet shaft 14 and hollow outlet and drive shaft 15 which are secured to endwalls 12 and 13 so as to be in register with the central apertures therein. Shafts 14 and 15 are mounted in bearing 16 and 17 respectively. The bearings are secured to mounting supports 18 and 19. A drive motor 20 connected to drive shaft 15 by means of a v-belt 21 causes the drum 10 to rotate in a counterclockwise direction as indicated by rotational arrow 22. Hollow shaft 14 serves as the feed inlet into the drum. Because the drum 10 rotates during operation, a rotary seal 40, if required, connects shaft 14 with stationary feed pipe 41.

Figure 2:
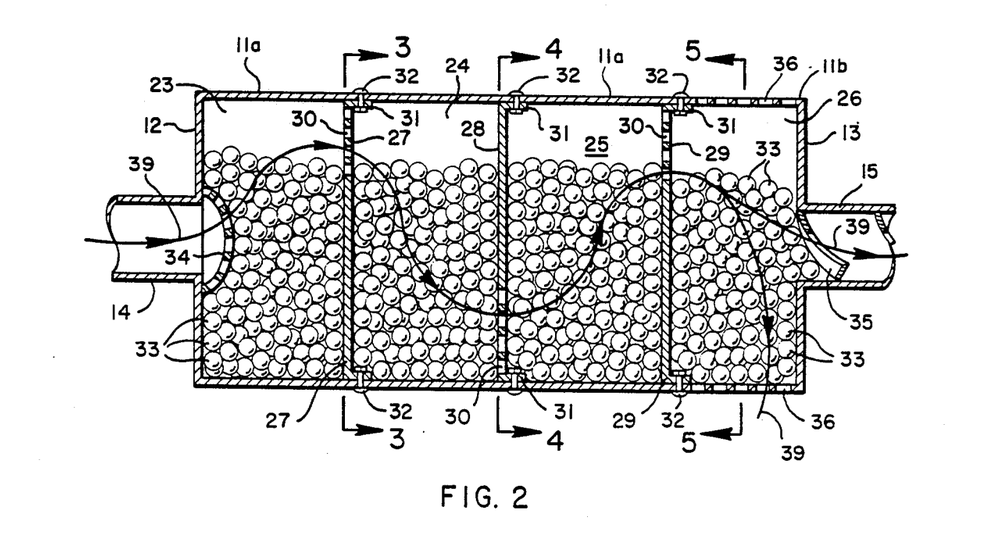
FIG. 2 is a longitudinal cross sectional view of the drum separator only, taken along lines 2—2 of FIG. 1, showing a rotating apertured drum, divided into lateral compartments, containing a slurry inlet, oleophilic free bodies and apertured baffles for directing the flow of mixture through the drum, and an apertured oleophilic sieve section.

Drum 10 is divided into four lateral compartments 23, 24, 25 and 26 as shown by FIG. 2 which is a longitudinal cross sectional view of the drum of FIG. 1. Entry compartment 23 is defined by solid sidewall 11a, endwall 12 and laterally positioned baffle plate 27. Adjacent lateral compartment 24 is defined by solid sidewall 11a and lateral baffle plates 27 and 28. The next lateral compartment 25 is defined by solid sidewall 11a and baffle plates 28 and 29. The outlet or separation compartment 26 is defined by perforated sidewall 11b, baffle plate 29 and front endwall 13. The number of compartments may vary. There may be as few as two, i.e. an entry compartment 23 and an outlet or separation compartment 26, or as many as may be practical.

Each laterally located baffle plate contains a series of apertures 30 which may be located throughout the baffle plate face or concentrated in one portion thereof extending from the circumference of one side edge inwardly across the face toward the center a predetermined distance. The number and size of apertures will depend upon various factors and may be readily determined by one skilled in the art upon reading this disclosure. When only a portion of the plate contains apertures, they will generally extend across about 10 to 40% of the diameter of the face of the baffle plate.

Each laterally located baffle plate preferably contains a rim or flange 31 around the circumference thereof and may be secured to the drum sidewall by fastening means 32, such as rivets or bolts. In the alternative, the baffle plates can be secured by welding or other similar means.

Each compartment is partially filled with oleophilic surfaced free bodies 33 which may be in the form of balls, rods or other acceptable geometric shapes. The free bodies are sized such that they will not pass through baffle plate apertures 30. A screen 34 is secured to the inner surface of endwall 12, about the central inlet opening where hollow inlet shaft 14 connects with endwall 12, to prevent free bodies 33 in inlet compartment 23 from entering into the interior of shaft 14. Outlet shaft 15 also contains means 35, such as auger blades, to prevent free bodies in separation compartment 26 from entering the interior of shaft 15.

The perforations 36, contained in the perforated portion of drum sidewall 11b making up outlet compartment 26, are also sized to be smaller than the diameter of the free bodies.

The interior and exterior surfaces of sidewall portion 11b are oleophilic and a scraper 37, such as a doctor blade, is mounted by means (not shown) to scrape and remove viscous oil phase passing through apertures 36 in sidewall 11b and adhering to the outside surface thereof. A hopper 38 is located immediately below the apertured sidewall 11b to collect aqueous and hydrophilic materials flowing through apertures 36 and not captured by the oleophilic surfaces of sidewall 11b.

Figure 3:
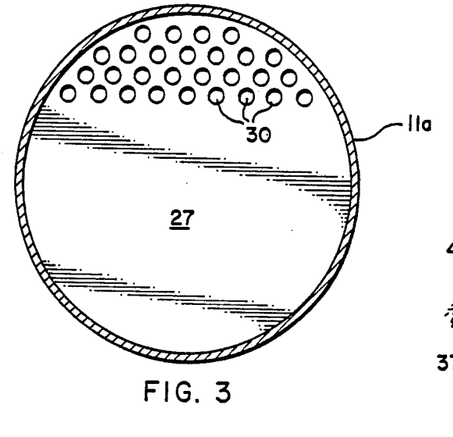
FIG. 3 is a transverse cross sectional view of the drum separator taken along lines 3—3 of FIG. 2 showing one of the apertured baffles.
Figure 4:
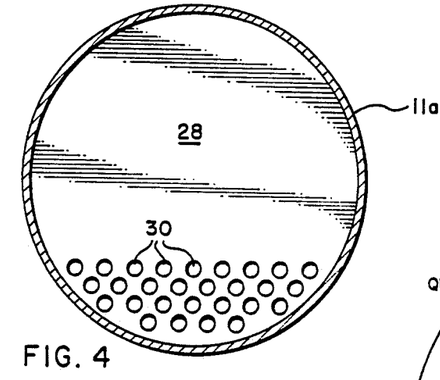
FIG. 4 is a transverse cross sectional view of the drum separator taken along lines 4—4 of FIG. 2 showing a second apertured baffle for controlling the mixture flow through the drum.

The dividing of the drum 10 into lateral compartments, and the positioning of the laterally located baffles 27, 28 and 29 to accomplish this, are best illustrated in FIGS. 2, 3 and 4. FIG. 2 is a cross sectional view of the drum of FIG. 1, and shows the formation of lateral compartments 23, 24, 25 and 26 by the lateral positioning of the baffles relative to the drum axis. The purpose of lateral baffles 27, 28 and 29 is to provide a restriction to the flow of a slurry mixture through the drum to assure intimate contact between the oil phase, and mineral particles in the slurry mixture and the free bodies 33 in order to capture the viscous oil phase in the slurry and cause it to come together into larger particle sizes. Therefore, the number and size of apertures 30 in the baffles may vary according to use in preventing unrestricted flow of the slurry mixture from one end of the drum to the other end over the top of the free bodies 33. For purposes of illustration, the apertures 30 in baffle 27 are shown as being in the upper portion of the plate.

FIG. 3 is a transverse cross section of drum 10 taken along lines 3—3 of FIG. 2 and shows the face of baffle plate 27 and the positioning of apertures 30 in the upper portion thereof.

FIG. 4 is a transverse cross section of the drum taken along lines 4—4 of FIG. 2 and shows the face of baffle plate 28 and the positioning of apertures 30 in the lower portion thereof. In other words, baffles 27 and 28 are the same except that baffle 28 has been secured to the inside of the drum sidewall 11a 180° out of phase with baffle 27. Similarly, baffle 29, as shown in FIG. 2, is in phase with baffle 27 and would have the same cross section as shown in FIG. 3.

Because the drum rotates, the apertured portion of the baffles will not remain in the "upper" or "lower" positions as described. However, the axial flow path of slurry in the drum from lateral compartment to compartment, caused by the baffles being located out of phase, will generally be as illustrated by directional arrow 39 in FIG. 2. If apertures 30 are located over a larger portion of the face of the baffle plates, the flow will be more direct than indicated by arrow 39; however, viscous oil phase adhering to the baffle plate and filling the apertures 30, still serves to restrict the flow of aqueous phase. Preferably, the inner surface of wall 11a and the surfaces of the baffle plates will be oleophilic such that oil phase will adhere to these surfaces which, in cooperation with the free bodies and the voids between the free bodies, slow the flow of oil phase through the axial length of the drum.

The size and number of apertures can vary from compartment to compartment as another means of regulating the desired flow rate of slurry through the drum.

The drum separator, as above described, can be utilized to separate oleophilic oil phase materials from a variety of sources when contained in a mixture consisting of an aqueous phase containing an oil phase into which mineral particles may or may not be incorporated.

The drum separator may also be used to remove hydrophilic minerals from a viscous oil phase. This may be achieved by adding water to a stream of oil phase, containing such minerals, entering the drum to provide a combined stream of oil phase and water phase mixture feed. Most of the hydrophilic minerals from the oil phase migrate into the water phase in the drum and exit with the water phase.

A slurry, or other mixture, enters the revolving drum through the rear via the stationary feed pipe 41. The mixture passes through rotary seal 40 and hollow inlet shaft 14 into the drum interior. In feed compartment 23, the mixture comes in contact with the first contingent of tumbling oleophilic free bodies 33. The viscous oil phase of the mixture entering compartment 23 comes in contact with oil phase adhering to the surface of the tumbling oleophilic free bodies 33. The viscous oil phase is captured by and unites with other oil phase matter on the surface of free bodies 33. Additional viscous oil phase is also captured in the voids between the free bodies. Mineral particles in the slurry having oleophilic surfaces come in contact with the viscous oil phase collected by the free bodies and are captured by the oil phase surrounding the free bodies. This oil phase acts as an adhesive to capture oleophilic mineral or metal particles that are in the slurry mixture. The oleophobic or hydrophilic mineral particles report to the aqueous phase of the mixture. Preferably, the inside wall surface of the drum will be rough to encourage tumbling of the free bodies and to discourage sliding of the inside drum wall past the free bodies.

The slurry mixture and collected oil phase then flow through apertures 30 in baffle plate 27 into lateral compartment 24 where they contact the free bodies 33 and oil phase that tumble in that compartment. Further collection of the oil phase, including mineral particles, from the aqueous phase takes place. The collected oil phase and oil depleted slurry mixture then flow through apertures 30 in baffle plate 28 into the third lateral compartment 25 where the process is repeated.

This procedure may be carried through as many compartments and baffle plates as is considered necessary to prepare the viscous oil phase, with or without minerals, for separation. The minimum number of compartments in this embodiment is two and the maximum is determined only by what is practical. The aqueous phase flows through the compartments initially at a faster rate than the oil phase because it is not held up by the oleophilic surfaced free bodies, the voids between or the oleophilic surfaces of the inside drum wall and baffle plates. These all provide resistance to the flow of oil phase. However, eventually an equilibrium or steady state will be reached where the amount of oil phase collected will be the same as the amount entering the drum in the slurry mixture. However, because of the flow restrictions, there will always be a lag or holdup of oil phase passing through the drum separator, resulting in an in situ oil phase concentration in the drum compartments that is higher than in the mixture entering the drum.

Finally, the slurry mixture and collected oil phase enters the outlet or separation compartment 26 where both the aqueous phase and oil phase leaves the drum 10. This last compartment contains an apertured oleophilic wall 11b. However, as an alternative, wall 11b could be solid and endwall 12 could be oleophilic and have apertures therein. As a second alternative, the cylindrical wall of the central compartment could be oleophilic and have apertures therein while the other compartments have solid cylindrical walls. In such a case, the slurry mixture could enter at either end of the drum and flow toward the center where it would be separated. In any event, the apertured wall of the outlet compartment of the drum is referred to as the "oleophilic sieve".

Oleophilic free bodies 33 are also contained in outlet compartment 26 and tumble therein. The aqueous phase, including hydrophilic particles, entering this compartment push through the aperture 36 in sieve wall 11b and fall into hopper 38. The viscous oil phase and collected mineral or metal particles, initally adheres to the free bodies in the outlet compartment and also to the oleophilic surface of the inside drum wall 11b. Oil phase contained in the voids between the free bodies is extruded therefrom to the inner surface of wall 11b and on through apertures 36 to the outside drum surface of wall 11b where they are removed by means such as scraper 37.

A portion of the oil phase remains in apertures 36 as the drum revolves past the scraper 37. The aqueous phase that flows through the apertures 36, due to pressure in the drum and/or due to gravity, pushes oil out of the apertures 36 onto the outside of the apertured wall 11b where it is collected on the next revolution of the drum past the scraper 37. However, some of the oil phase is also carried out of the apertures along with the aqueous phase into the hopper 38. This oil phase becomes aerated as it is carried through the apertures into the surrounding air by the aqueous phase and subsequently floats on the surface of the aqueous phase in hopper 38. This floating oil phase can be skimmed off the top in the hopper and returned to the inlet pipe 41 as a recycle stream or otherwise treated.

Outlet shaft 15 is an additional outlet for aqueous phase and will normally be used only when the flow rates through drum 10 are sufficiently high that the apertures 36 in drum wall 11b cannot accomodate them. In that event, shaft 15 serves as an optional outlet for the removal of aqueous phase. The hollow interior of shaft 50 is provided with auger blades which permit aqueous phase to pass out of the drum but which augers back into compartment 26 any free bodies and associated oil phase as these attempt to enter this outlet.

There are various factors which determine the actual generally axial flow path 39 of mixture through the lateral drum compartments. One of these is the size of the baffle apertures 30 and the area of the baffle plate face they occupy. As the drum rotates, the baffle apertures may be found in any position of rotation, e.g. top, bottom, side or anywhere in between. As oil phase attempts to pass through the baffle apertures in going from one lateral compartment to another, the oil phase may temporarily fill these apertures. The tumbling oleophilic free bodies 33 only partially fill each compartment. Therefore, as the drum rotates, the aqueous phase in the upper portion of the compartment above the free bodies will push the oil phase out of the baffle apertures as the aqueous phase flows into the next compartment. In the lower portions of the drum compartments along solid wall 11a, the tumbling free bodies 33 will push the oil phase through apertures 30 in order to cause flow of oil phase and aqueous phase from compartment to compartment.

Regardless of the number and size of apertures 30 in each baffle plate, the fact remains that at least an apertured portion of each baffle plate will rotate so as to be alternately above and below the level of the tumbling free bodies. Therefore, aqueous phase and oil phase, along with their attendant oleophilic or hydrophilic particles, will pass through the baffle plate apertures 30 in the manner indicated.

The size of the apertures and their number in each baffle plate are variables that may be used to control the efficiency, effectiveness and flow path of a mixture and may vary according to the characteristics of the mixture to be separated and the results desired. Obviously, the more and larger apertures there are, the more linear will be the axial flow path and the less holdup of oil phase will occur.

When the baffle plates are perforated over the entire face, the alternate filling with oil phase of the apertures as they revolve, and the alternate pushing of oil phase out of the apertures by the aqueous phase, causes the desired control and flow path of the mixture through the drum.

Other variables include flow rate of the separating mixture through the drum, viscosity of the oil phase, concentration of oil phase in the mixture, concentration and size of free bodies in each compartment, concentration and size of solids in the mixture, temperature of the mixture, number of compartments, drum length and diameter and rotation rate of the drum. The rate of rotation of the drum may be as slow as desired to achieve the objectives of a particular process but will not exceed the critical rate of drum rotation. This critical rate of rotation is that rate where, at the apex of the drum, the centrifugal force is equal to the force of gravity. When the drum is rotated at a rate that approaches this critical rate, some of the free bodies 33 cease to tumble in the drum, thereby negatively affecting the efficiency of the process.

Figure 5:
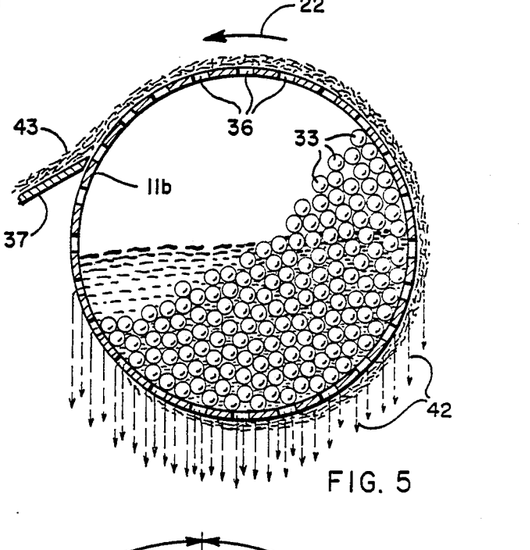
FIG. 5 is a transverse cross sectional view of the drum separator taken along lines 5—5 of FIG. 2 and also showing the oleophilic free bodies inside the rotating drum, the aqueous phase of the mixture leaving the drum through the apertured oleophilic sieve wall and the oil phase being transferred to the outside of the oleophilic sieve wall and being scraped off by one type of scraper means.
Figure 6:
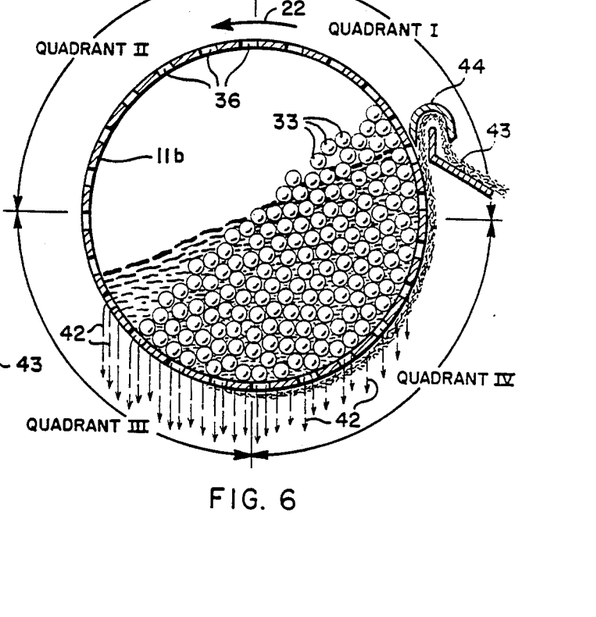
FIG. 6 is a transverse cross sectional view of a drum separator similar to FIG. 5 but having a different type of scraper means located in a different position. The drum is also depicted as being divided into rotational quadrants.

The separation of the aqueous and oil phases in compartment 26 and the recovery of the oil phase are best illustrated in FIGS. 5 and 6 which differ only in the means by which oil phase is scraped off or removed from the surface of the outer drum sidewall 11b. FIG. 5 is a transverse cross section of drum 10 taken along lines 5—5 of FIG. 2 showing apertured drum sidewall 11b and the position of free bodies in compartment 26 caused by the rotation of drum 10 as indicated by directional arrow 22. FIG. 6 is the same except for the positioning of alternate scraper means 44.

For purposes of illustration, the drum of FIG. 6 has been divided into four quadrants, I, II, III and IV. The drum rotation is counter clockwise and quadrant I represents the 12 o'clock to 3 o'clock position. Quadrant II is the section bounded by the 9 o'clock and 12 o'clock positions. Quadrant III is the area bounded by the 6 o'clock and 9 o'clock positions and quarant IV is depicted by the 3 o'clock and 6 o'clock positions.

The aqueous phase of the mixture containing hydrophilic particles is indicated by directional arrows containing numeral 42. The oil phase is indicated by numeral 43. Because of the rotational direction, the free bodies 33 tend to congregate in quadrant IV with some being carried up by rotation along wall 11b to quadrant I and falling back by gravity to quadrant III. However, this tumbling action tends to concentrate the free bodies in the general area of quadrant IV. The oil phase is richest in this area of quadrant IV and tends to fill the voids between the free bodies. Because the voids are at least partially filled with oil phase, the flow of aqueous phase in the area of quadrant IV is restricted. This results in a significant reduction of aqueous phase leaving the drum sidewall apertures in the area covered by free bodies 33. As a result, most of the aqueous phase 42 flows over the top of the free bodies 33 and through the voids between the free bodies not yet filled with oil phase and through the sidewall apertures 36 in quadrant III as more particulary shown in FIG. 6. Flow of aqueous phase 42 can also occur through apertures 36 in quadrant II when the flow rate of slurry through the drum 10 is high enough and/or when the level of free bodies 33 in outlet compartment 26 is sufficiently high. The aqueous phase leaving apertures 36 are collected in hopper 38 as shown in FIG. 1 or by other suitable means.

Because the aqueous phase tends to leave the drum in quadrant III where the free bodies content is minimal and the oil phase tends to congregate and be carried along with the free bodies to quadrant IV, the oil phase and aqeuous phase are removed from the drum in separate quadrant areas of rotation. The oleophilic apertured sidewall 11b, in conjunction with the tumbling free bodies 33, causes the oil phase to migrate and adhere to the inner oleophilic surface of sidewall 11b. The concentration of oil phase adjacent the drum sidewall, beginning in quadrant III and becoming more pronounced in quadrant IV, combined with the tumbling of the free bodies causes the adhering oil phase to be extruded through the apertures 36 of the sidewall 11b to the outer surface thereof. Since the outer surface is also oleophilic, the oil phase particles adhere thereto until the accumulated amount of oil becomes too great and falls off, is scraped off, is pulled off or until the aqueous phase flowing through the apertures strips it off an exposed sidewall surface. During normal operation, all these methods of oil phase removal from the outer surface can occur. Hence oil phase removal can be preferably effected in either quadrants I or II as illustrated in FIGS. 5 and 6. The oil phase is depicted by numeral 43 and its migration through apertures 36 of sidewall 11b can be seen with the accumulation increasing on the outer surface beginning in quadrant III and increasing in the direction of drum rotation through quadrant IV and on to succeeding quadrants until removed by scraper 37 as shown in FIG. 5 or alternate scraper means 44 as shown in FIG. 6. The scraper can be located in any convenient location but oil phase 43 should be removed prior to the point of rotation where aqueous phase will again fall through apertures 36. Normally scraper 37 is adjacent to the apertured wall 11b but need not actually contact the wall in order to minimize abrasion. In FIG. 5 scraper 37 is shown removing oil phase in quadrant II whereas, in FIG. 6, the oil phase is removed by alternate scraping means 44 located in quadrant I.

The actual point of location of scraping or removal means will depend somewhat on the viscosity of the oil phase on the drum surface. It is preferable to scrape the outside surface of sidewall 11b on that portion of rotation where the oil phase layer is the thickest. For example, the force of gravity pulls the free bodies 33 away from the inside of sidewall 11b in quadrant I resulting in some of the oil phase flowing back into the drum through apertures 36 in that quadrant. If the oil phase is of sufficiently low viscosity, additional oil phase may flow back through apertures 36 into the drum in both quadrants I and II. Therefore, it may be desirable to remove the oil phase between the 2 and 3 o'clock positions of quadrant I as illustrated in FIG. 6 or between the 3 and 4 o'clock positions of quadrant IV.

A portion of the oil phase may be extruded through apertures 36 in quadrant IV and fall off the outer surface of sidewall 11b. By proper placing of an oil phase receiver (not shown) under the drum in quadrant IV and by proper placing of an aqueous phase receiver (not shown) under the drum in quadrant III, the oil phase and aqueous phase may be collected separately, and perhaps even without the use of a scraper.

The aeration that takes place in the oil phase that is carried along by the aqueous phase from the apertures in quadrants II, III and IV causes these oil phase particles to be low in density, and therefore the oil phase particles easily rise to the top of the aqueous phase in the aqueous phase collector. This aerated oil phase may be skimmed off and either returned to the drum inlet for reprocessing or separately treated as desired.

As above described, oil phase may be removed from the outside of apertured wall section 11b by means of a scraper or by means of permitting the oil phase to drip off the drum wall by gravity in quadrant IV.

A different, and generally preferred, means of oil phase removal is by means of an apertured oleophilic endless belt that is in contact with the drum wall 11b and pulls the oil phase off the drum wall. This method of oil phase removal is illustrated in FIG. 7 and further enumerated upon in regards to FIGS. 8-11.

The operation of the drum 10 of FIG. 7 is similar to the operation of the drum described in regards to FIGS. 1-6 except for the oil phase removal means. Therefore, the numerals in FIG. 7 coincide with FIGS. 1-6 except that mesh belt 45 replaces scraper 37 or alternate scraping means 44.

In FIG. 7 an apertured oleophilic belt 45, wrapped around the apertured section 11b of drum 10, is used to remove the oil phase from the outside of the apertured drum wall. In this case, the drum 10 acts as a conveyor end roller for the mesh belt 45. One or more other end rollers (not shown) may be used to support the belt and form it into a conveyor to transport the oil phase upward and away from the drum. The oleophilic mesh belt 45, in contact with the apertured outside drum wall, then acts as the oleophilic sieve and its apertures are in series with the apertures 36 of drum 10. The aqueous phase passes through the drum apertures and then through the belt apertures to disposal. This occurs mainly in quadrant III and to a lesser degree in quadrant IV. The oil phase is extruded mainly in quadrant IV through the drum apertures 36 and into the apertures 46 of the belt 45. This enables the oil phase passing through the drum apertures to be captured by the oleophilic belt 45. The oil phase fills the apertures of the belt, and in most cases, adheres to the belt as a thick and viscous oil layer which is carried up and away by the mesh belt acting as a conveyor. The oleophilic belt 45 is endless and revolves continuously conveying the extruded oil phase away from the drum to a recovery zone (not shown) where the oil phase is removed continuously from the belt by means such as squeeze rollers and/or heat. The heat may be provided by heating the rollers in the recovery zone or by jets of steam that strip the oil phase from the belt, by induction heating of the belt or by any other suitable means. Heat is used in the recovery zone to reduce the viscosity of the oil phase to make it easier for the oil to fall from the mesh belt or to be squeezed from the belt. Alternately, a solvent may be used in the recovery zone to dilute the oil and strip it from the belt. The belt then revolves back to the drum for capturing more oil phase on a continuous basis.

FIGS. 1 and 2 illustrate a drum separator in which the mixture to be separated flows axially or laterally through the drum compartments. However, the objectives of the invention may also be achieved by forcing the mixture to flow radially through concentric drum compartments that are connected by concentric cylindrical apertured baffles having oleophilic surfaces. Such an apparatus and method are illustrated in FIG. 8.

Figure 8:
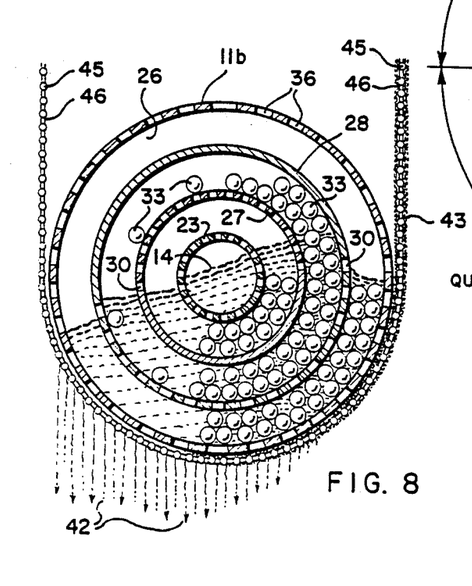
FIG. 8 is a transverse cross sectional view of a different embodiment of the invention showing a drum separator divided into concentric baffles and compartments wherein the inlet is at the axial center of the drum and the apertured outlet compartment comprises the circumferential wall of the drum and wherein the drum wall is partially wrapped by an apertured oleophilic endless belt.

The operation of the drum of FIG. 8 is similar to the operation of the drum described in FIGS. 1-7 with the primary difference being in the direction of flow of mixture through the drum. Therefore, the numerals in FIG. 8 coincide with FIGS. 1-7 for functional equivalents wherein the drum compartments and baffles are arranged concentrically instead of laterally.

In FIG. 8, the aqueous and oil phase mixture enters near the axis of the drum through a central inlet 14 and flows through screen 34 to enter the first concentric compartment 23, which is partly filled with oleophilic free bodies 33. The drum is divided into three concentric compartments 23, 24 and 26. The entry or inlet concentric compartment 23 is defined by two solid endwalls (not shown), a cylindrical inlet screen 34 and cylindrical baffle plate 27. The next outer concentric compartment 24 is defined by two solid endwalls (not shown) and concentric cylindrical baffle plates 27 and 28. The separation or outlet concentric compartment 26 is defined by two solid endwalls (not shown), by baffle plate 28 and by perforated sidewall 11b. Each baffle plate contains a series of apertures 30 which may be located throughout the entire baffle plate surface or concentrated in one portion thereof just as in the lateral baffles shown in FIGS. 1–7. As in the previous figures, the purpose of cylindrical baffles 27 and 28 is to provide a restriction to the flow of separating mixture through the drum to insure intimate contact between the oil phase and the free bodies to capture the viscous oil phase and oleophilic surfaced mineral particles contained in the mixture. Therefore, the number and size of apertures 30 in the baffles may vary according to use in preventing unrestricted radial flow of aqueous phase from the inlet at the axis to the outside apertured surface 11b of the drum. In this embodiment, the apertured outer surface 11b may encompass the entire outer surface of the drum thereby eliminating a solid portion 11a as shown in FIGS. 12 and 13 or may encompass only a portion of the drum as shown in FIGS. 1 and 2.

In a manner similar to lateral baffles in FIGS. 1–4, the concentric baffles 27 and 28 of FIG. 8 may contain a series of apertures 30, which may be located throughout the entire baffle plate or concentrated in one portion. Moreover, the concentric baffle plates may be positioned to provide a controlled path of flow for the oil and aqueous phases of the mixture. The oil phase extruded through apertures 36 in outer wall 11b may be recovered using wall 11b as an oleophilic sieve as in FIG. 1 wherein a scraper is used to remove the oil phase from the drum surface. In the alternative, the procedure described in conjunction with FIG. 7 may be used wherein an endless belt carries the oil phase away from the drum wall. The partitioning of oil phase from aqueous phase along the baffles 27 and 28 and oleophilic sieve wall 11b in the direction of drum rotation, according to quadrant positions in FIG. 8, is similar to that described for the quadrants of FIG. 6.

The apertured oleophilic endless belts of FIGS. 7 and 8, which provide, in part, the oleophilic apertured wall or oleophilic sieve for removing the viscous oil phase from the apertured drum wall, may be a woven belt. While a punched steel sheet may suitably serve as the endless belt, a woven belt has been found to work more effectively in allowing aqueous phase to flow through both the apertures of the drum wall and the apertures of the belt wall.

Figure 9:
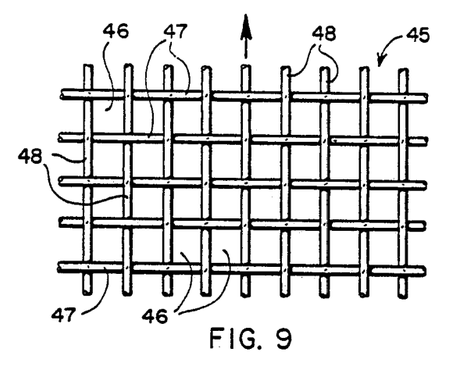
FIG. 9 is a top sectional view of one embodiment of an endless oleophilic mesh belt utilized in the drum embodiments of FIGS. 7 and 8.

The woven belt may be a mesh belt woven from monofilament polyester, nylon or other non-metallic fibers which have oleophilic surfaces. Alternately, it can be woven from single strands of metal wire, particularly steel wire and steel alloy wire. Multistrand cables, such as steel cable or steel alloy cables may also be utilized. A portion of an endless open weave mesh oleophilic belt 45 is illustrated in FIG. 9. The belt consists of longitudinal wires 48 that lay in the direction of belt rotation and perpendicular cross wires 47 at right angles to wires 48. The longitudinal wires 48 may be pre-bent in a sinusoidal fashion to provide for ease in weaving the belt and to also provide for uniform spacing between the cross wires 47. Cross wires 47 preferably are not pre-bent and this provides strength and improved rigidity to the belt for easier tracking on the drum wall. The mesh belt is woven in an open weave pattern such that, on the average, both the width and length of each aperture 46 are larger than the diameter or thickness of wires 47 and 48. In many cases the aperture openings 46 can be from two to ten times greater than the diameters of wires 47 and 48.

The preferred size of openings 46 in the belt depends upon the viscosity of the oil phase being recovered. When the viscosity is less than 1000 poises, the preferred mesh opening is less than 4 millimeters. When the viscosity is greater than 100,000 poises at processing temperature, the preferred mesh opening size is greater than 10 millimeters. When the viscosity of the oil phase is between about 1000 and 10,000 poises, the preferred mesh opening will be between about 1 to 10 millimeters. The preferred diameter of wires 47 and 48 is between about 1 and 5 millimeters. When metal is being used and the diameter of longitudinal wires 48 exceeds about 2 millimeters, it is preferred that they be made from multistrand cable so that the belt does not become too stiff to curve around the drum wall 11b or around other guide rollers used for controlling the belt.

Figure 10:
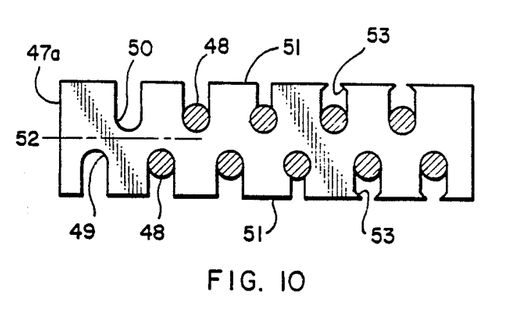
FIG. 10 is an end sectional view of an endless oleophilic mesh belt containing means to protect it from abrasion.

Abrasion resistance of the endless belt may be improved by using, in addition to or in the place of a cross wire 47, a cross bar 47a as illustrated in FIG. 10. This is of particular importance when steel cables are used as longitudinal wires 48. Cross bar 47a is provided with indentations 49 and 50 alternating on either side of the bar to hold wires 48. Cross bars 47a are provided with wear surfaces 51 on the top and bottom which serve as contact points between the belt and drum or between the belt and belt guides and rollers used to train the belt. The cross bars 47a may be machined by a milling tool or may be drop forged to achieve the desired shape. Indentations 49 and 50 must be deep enough that the wear surfaces 51 protrude beyond the diameter of wires 48. This will assure that the wear surfaces receive the contact instead of the wires. This is particularly important when multistrand cables are used for the longitudinal belt wires, as they tend to fray after extended use due to wear and breakage of individual cable strands. However, the indentation 49 and 50 should not be so deep as to cause bunching of the cross bars 47a resulting in irregular spacing thereof. This is prevented by assuring that the centers of the wires 48 at all times are spaced some distance away from the center line 52 of each cross bar 47a. Strands 48 of the belt are forced into an approximately sinusoidal or serpentine shape by the cross bars when they are indented as described. Thus, the depth of the indentations 49 and 50 should be deep enough that wear surfaces 51 extend beyond the strands but shallow enough to assure that the strands 48 retain a regular serpentine shape. The cross section of bar 47a is shown as being rectangular but may be of any other desired shape. In addition, the belt may be rubber coated and vulcanized to achieve a bond and seal between wire strands 48 and cross bars 47a at their juncture to reduce abrasions by granular particles of the mixture. If desired, the throat of the indentations 49 and 50 may be smaller in size than the wire 48 diameter or a crimp 53 may be made in the cross bar to prevent movement of wire 48 close to wear surface 51.

Figure 11:
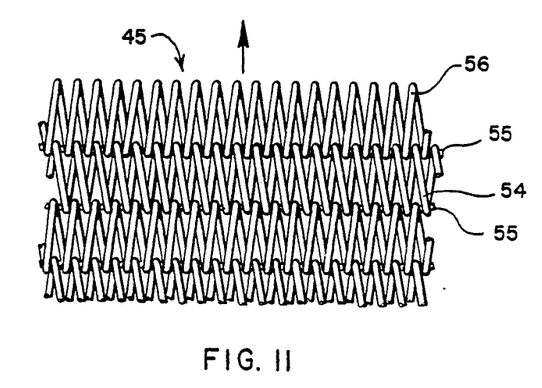
FIG. 11 is a top sectional view of a different embodiment of an oleophilic endless belt made up of joining left and right hand spiraling metal wire sections.

Another embodiment of an open weave belt 45 is shown in FIG. 11, which is a portion of a spiral type belt. This belt is fabricated by joining a multitude of flattened metal wire coils or spirals 54 and 56 with straight or serpentine crimped metal wire cross rods 55 to form a long endless metal belt that is very flexible in the direction of belt rotation. As illustrated, the belt is formed by joining right handed metal wire spiral sections 54 to left handed spiral sections 56 in alternating pairs by means of straight or serpentine crimped cross rods 55. Such a belt is essentially an endless array of hinges formed by cross rods and spirals and can be made from a wide range of oleophilic metals such as steel and steel alloys to make them strong and wear resistant.

A spiral metal belt differs from the open weave mesh belt in the thickness thereof. For a woven mesh belt, such as shown in FIG.9, the thickness is approximately the sum of the diameters of one longitudinal wire 48 and one cross wire 47. For a spiral belt as shown in FIG. 11, the thickness is generally greater than the sum of the thicknesses of one cross rod wire 55 and two spiral wires 54 or 56. The increased belt thickness in this embodiment does not inhibit the flexibility of the belt and serves to increase belt storage capacity for oil phase being carried or conveyed away from the drum wall. Preferred aperture sizes for a spiral belt are similar to those for the open mesh belt when the width of an aperture is defined as the space between adjacent spirals of a coil and the length of an aperture is the space between adjacent cross rods. The preferred strand or wire size for a spiral belt is similar as for a mesh belt. However, the increased thickness of the spiral belt for a given wire thickness affords greater operability ranges of oil phase viscosity for a given aperture size.

Removal of oil phase from an oleophilic endless apertured belt, after it is conveyed away from the drum wall, is achieved most effectively by the use of heat. Heating of the belt may be achieved by training the belt over a set of steam heated rollers or by jetting the belt with live steam. When the belt is made from an electric conductor, such as steel, it may also be done by passing the belt along induction coils which generate heat inside the wires, rods or strands of the belt in a manner analogous to an induction oven. Heat transfer for oil phase removal from the belt is especially efficient when metal is used for the construction of the belt. The metal materials in the belt serve as heat conductors to heat the bond between the belt surfaces and the oil phase. When this bond is heated, it reduces the viscosity of the oil phase immediately adjacent to the metal of the belt which results in a sloughing off of the oil phase. In this manner, the oil phase immediately adjacent the belt is heated to a higher temperature than the bulk of the oil phase on the belt. The resulting rapid reduction in oil viscosity and sloughing off of oil phase from the belt, in a controlled manner, makes efficient use of the available heat.

In addition to the advantages of increased storage capacity for oil phase and rapid viscosity reduction immediately adjacent to the metal upon heating, metal belts also have an additional advantage over plastic or rubber belts when being used for separating oil phase from an aqueous phase. For example, for some mixtures it has been discovered that, in the presence of water, steel has a lower contact angle with oil phase than do non-metals such as polyester. For example, steel having a smaller contact angle, is more oleophilic in the presence of water than plastics such as polyester. This can often result in more effective capture of the oil phase from the separating oil and water phase mixture where the belt serves as part of the oleophilic sieve.

From the above description and drawings it may be seen that there are two distinct but related advantages resulting from the present invention. One advantage results from the passage of the mixture through lateral or concentric compartments containing free bodies which restricts the flow of mixture through the drum allowing an in situ buildup of oil phase in the drum and a slow passage of oil phase through the drum relative to the aqueous phase.

The second distinct advantage has to do with the partitioning of the oil phase from the aqueous phase in the outlet compartment as the mixture leaves the drum. This results from the use of free bodies in that compartment and the physical properties of the two phases being separated. This advantage may be applied to a drum separator containing only a single compartment having free bodies. Hence, while described in conjuction with a drum separator having multiple lateral or concentric compartments, this portion of the invention could be utilized in a single compartment drum separator having an apertured wall. Separation may not be as efficient as when using multiple compartments. However, there may be instances when a single compartment is sufficient and that embodiment is considered to be within the scope of the present invention. This modification is more specifically described in reference to FIGS. 12 and 13.

FIG. 12 shows a drum separator similar to that shown in FIGS. 1-7 having a single compartment. Because of the similarities, the numerals will be the same as in the previous figures for elements having the same or similar functions. Hence, there is shown in FIG. 12 drum 10 mounted in a generally horizontal position and consisting of an apertured cylindrical sidewall 11b, which serves as an oleophilic sieve outlet, and containing a rear endwall 12 (not visible) and a front endwall 13. The endwalls contain central apertures to provide inlet and outlet feed means. The drum is supported by hollow inlet shaft 14 and hollow outlet and drive shaft 15, which are secured to endwalls 12 and 13 so as to be in register with the central apertures therein. Shafts 14 and 15 are mounted in bearing 16 and 17 respectively. The bearings are secured to mounting supports 18 and 19. A drive motor 20, connected to drive shaft 15 by means of a v-belt 21, causes the drum 10 to rotate in a counter-clockwise direction as indicated by rotational arrow 22. Hollow shaft 14 serves as the feed inlet into the drum. Because the drum 10 rotates during operation, a rotary seal 40, if required, connects shaft 14 with stationary feed pipe 41.

In this embodiment, drum 10 has only a single compartment 26 as shown by FIG. 13, which is a longitudinal cross sectional view of the drum of FIG. 12. Compartment 26 is defined by endwall 12, by perforated sidewall 11b, and front endwall 13.

Compartment 26 is partially filled with oleophilic surfaced free bodies 33 which may be in the form of balls, rods or other acceptable geometric shapes. The free bodies are sized such that they will not pass through sidewall apertures 36. A screen 34 is secured to the inner surface of endwall 12, about the central inlet opening where hollow inlet shaft 14 connects with endwall 12, to prevent free bodies 33 from entering into the interior of shaft 14. Outlet shaft 15 also contains means 35, such as auger blades, to prevent free bodies from entering the interior of shaft 15.

The interior and exterior surfaces of sidewall portion 11b are oleophilic and a scraper 37, such as a doctor blade, is mounted by means (not shown) to scrape and remove viscous oil phase passing through apertures 36 in sidewall 11b and adhering to the outside surface thereof. A hopper 38 is located immediately below the apertured sidewall 11b to collect aqueous and hydrophilic materials flowing through apertures 36 and not captured by the oleophilic surfaces of sidewall 11b.

In the embodiment shown in FIGS. 12 and 13, a slurry, or other mixture, enters the revolving drum through the rear via the stationary feed pipe 41. The mixture passes through rotary seal 40 and hollow inlet shaft 14 into the drum interior. Inside, the mixture comes in contact with the tumbling oleophilic free bodies 33.

As in FIGS. 1-7, the viscous oil phase of the mixture comes in contact with oil phase adhering to the surface of the tumbling oleophilic free bodies 33. The viscous oil phase is captured by and unites with other oil phase matter on the surface of free bodies 33. Additional viscous oil phase is also captured in the voids between the free bodies. Mineral particles in the slurry having oleophilic surfaces come in contact with the viscous oil phase collected by the free bodies and are captured by the oil phase surrounding the free bodies. This oil phase acts as an adhesive to capture oleophilic mineral or metal particles that are in the slurry mixture. The oleophobic or hydrophilic mineral particles report to the aqueous phase of the mixture. Preferably, the inside wall surface of the drum will be rough to encourage tumbling of the free bodies and to discourage sliding of the inside drum wall past the free bodies.

Although only a single compartment is utilized, the aqueous phase will flow through this compartment initially at a faster rate than the oil phase because it is not held up by the oleophilic surfaced free bodies, the voids between or the oleophilic surfaces of the inside drum wall. These all provide limited resistance to the flow of oil phase. However, eventually an equilibrium, or steady state, will be reached where the amount of oil phase collected will be the same as the amount entering the drum in the slurry mixture. However, because of the flow restrictions, there will always be a limited lag or holdup of oil phase passing through the drum separator, resulting in an in situ oil phase concentration in the drum that is somewhat higher than in the mixture entering the drum. However, this will not be as great as in the compartmentalized drum of FIGS. 1-7

The slurry mixture, consisting of aqueous phase and collected oil phase, leaves the drum 10 through the apertures in wall 11b which is referred to as the "oleophilic sieve".

The aqueous phase, including hydrophilic particles, push through the aperture 36 in sieve wall 11b and fall into hopper 38. The viscous oil phase and collected mineral or metal particles, initally adheres to the free bodies and also to the oleophilic surface of the inside drum wall 11b. Oil phase contained in the voids between the free bodies is extruded therefrom to the inner surface of wall 11b and on through apertures 36 to the outside drum surface of wall 11b, where they are removed by means such as scraper 37.

A portion of the oil phase remains in apertures 36 as the drum revolves past the scraper 37. The aqueous phase that flows through the apertures 36, due to pressure in the drum and/or due to gravity, pushes oil out of the apertures 36 onto the outside of the apertured wall 11b where it is collected on the next revolution of the drum past the scraper 37. However, some of the oil phase is also carried out of the apertures along with the aqueous phase into the hopper 38. This oil phase becomes aerated as it is carried through the apertures into the surrounding air by the aqueous phase and subsequently floats on the surface of the aqueous phase in hopper 38. This floating oil phase can be skimmed off the top in the hopper and returned to the inlet pipe 41 as a recycle stream or otherwise treated.

Outlet 15 functions as described in conjunction with FIGS. 1 and 2.

The separation of the aqueous and oil phases in compartment 26 and the recovery of the oil phase are the same as previously described in FIGS. 5 and 6 and need not be repeated. Oil phase removal from the exterior of wall 11b may be by means of a scraper or endless belt as also previously described in detail in conjunction with FIGS. 1-11.

Another modification, also within the scope of the invention, would be to separate the outlet compartment from the other compartments. In this embodiment, the final separation from the outlet compartment through the oleophilic sieve would take place in a separate apparatus. Thus, the oil phase hold up in the drum containing free bodies would occur in one apparatus and the conditioned mixture would be transported to a separation apparatus, also containing free bodies, functioning as the oleophilic sieve.

The sizing of the rotating drum, number of compartments, degree of fill of compartments with free bodies, rate of drum rotation, temperature of separation, free body size, density and shape and other operating parameters are obtainable to one skilled in the art upon reading this description. The following general parameters may be helpful.

The size of the free bodies is preferably much larger than the apertures in the baffle plates or drum walls so that the free bodies remain inside their respective drum compartments. Spherical balls, cylindrical rods or any other suitable geometrical shapes may be utilized. Rods may be solid bars or hollow pipes slightly shorter than the drum compartments. Steel balls, grinding balls, neoprene balls, artificial rubber balls, golf balls, or balls of any other oleophilic material may be used. Mixtures of different shapes or materials may also be utilized for the stated purposes. The charge of free bodies in each compartment should have a bulk density sufficient to assure mixing with the slurry mixture in order to achieve effective tumbling and separation. The preferred density of the free bodies is governed by the viscosity of the oil phase, the density of the slurry and the level of slurry maintained in the separation compartment. For example, when the free bodies are light and the oil phase is very viscous, these free bodies will not tumble but will stick to the drum walls and baffles as a solid mass. When the free bodies are too dense, they will tumble very readily but the drum will be very noisy and will need to be very sturdy to accept the weight and impact of the tumbling free bodies. The preferred bulk density of the free bodies is between about 1.0 gm/cc and about 8.5 gm/cc and the more preferred density is between about 2.0 gm/cc and 4.0 gm/cc. The diameter of the free bodies will preferably be between about 5 and 200 millimeters. Since the apertures in the baffles and in the drum walls are smaller than the size of the free bodies, the width of the apertures will preferably be between about 2 and 150 millimeters. The word "width" is used to express an opening parameter which will prevent free body passage therethrough even though that opening may have another dimension much greater than the width. For example, an opening in the form of a rectangular slot, an oval or a crescent may have a "length" larger than the diameter of a free body but free bodies may still be prevented from passage through the opening because the width of the opening is smaller than the diameter of the free body.

The desired temperature to be used in the rotating drum will also vary over a wide range and is dictated, to a large degree, by the viscosity of the oil phase and the amount of water in the mixture. Temperatures will not be below the freezing temperature of water nor above the boiling temperature of water. What is important is that sufficient water be present to allow all mixture components to be mixed in the drum at the temperature used and to allow the oil phase to adhere to the oleophilic surfaces of the free bodies, baffle plates and drum walls, including the oleophilic sieve portion. For energy requirement considerations, it is preferable to operate the process as close as possible to the temperature of the slurry ready for separation.

To illustrate the process of the invention, the following examples are given. It should be understood, however, that they are given only by way of illustration and in no way limit the scope of the invention.

EXAMPLE I

Tailings pond sludge from a commercial mined tar sand plant is separated by means of a two stage process using two drums similar to the one illustrated in FIG. 7 to produce bitumen and a heavy minerals concentrate. The reference to quadrants is the same as shown in FIG. 6. The sludge is a waste product from the separation of mined tar sand that results when the tailings from this plant are deposited into a holding pond, where it settles into three components: (1) sand that settles near the shore of the pond, (2) clear water that settles at the top of the pond and (3) sludge that settles near the middle and bottom of the pond. The sludge contains approximately 7% bitumen, 69% water and 24% mineral matter composed of silt, clay, carbonaceous material and heavy minerals. The heavy minerals include, among others, rutile, zircon, ilmenite and leucoxine. The sludge in the pond is at 15° C. and has a pH of about 9.2. An average of 100 tonnes per hour of sludge are pumped continuously from the tailings pond and are processed through the first drum. This is a steel drum, 8 meters long, 3 meters in diameter and is divided into four equal length lateral compartments, each compartment being separated by a lateral perforated steel baffle. The perforations in these baffles are 10 mm. round holes spaced on 15 mm. staggered centers. The cylindrical wall of the front or outlet compartment is perforated over its full surface with 10 mm. round holes spaced on 15 mm. staggered centers. The drum is supported by 260 mm. O.D., 160 mm. I.D. hollow protrusions from the rear and front walls of the drum which are mounted in bearings to permit rotation of the drum. The protrusion at the rear of the drum serves as the sludge inlet and is provided with a rotary seal to permit hooking of the inlet to a stationary inlet pipe. The front protrusion is closed off. The perforated front compartment of the drum is filled 40% full of a 50/50 mixture of 66 mm. diameter steel grinding balls and golf balls and the other compartments are filled 65% full with the same mixture of balls. These balls remain at all times in their respective compartments while the sludge passes successively through each compartment. The drum is rotated continuously at 2 rpm by means of a chain, a gear box and an electric motor. Except for the front compartment, four 1.8 meter long 5×5 cm. flanged 0.5 cm. thick angle irons are welded equidistant along the interior cylindrical wall of each compartment to prevent sliding of the balls along the drum wall and to encourage ball tumbling. In the outlet compartment, the wall apertures serve the same function. A hopper is mounted under the apertured outlet compartment to catch the aqueous phase that falls away from the drum. This hopper is provided with a skimmer for continuously skimming the top liquid layer into an overflow tank. The contents of the overflow tank are recycled back to the inlet of the drum by means of a pump. A 2.2 meter wide apertured steel process belt is mounted around the apertured compartment of the drum, which serves as a conveyor end roller for this belt. A conventional conveyor idler roller, 2.4 meters wide and 1 meter in diameter, is mounted 8 meters above the drum to provide the required second end roller for the belt. The belt is made from links of flattened coiled springs as illustrated in FIG. 11 sized to provide roughly 4×8 mm. generally rectangular openings in the belt. Under the process operating conditions with this type of sludge, the steel balls, the golf balls and the apertured drum walls are all oleophilic. Water, silt and hydrophilic clay pass through the drum apertures and through the belt apertures predominantly in quadrant III and fall into the hopper under the drum. A small amount of bitumen is carried along by this aqueous phase, but most of this bitumen floats on top of the aqueous phase flowing through the hopper. It is skimmed off into the overflow tank and is recycled to the inlet of the drum. Bitumen, heavy minerals and some clay and silt accumulate in the voids between the balls in the compartments of the rotating drum and are extruded through the apertures in the outlet compartment predominantly in quadrant IV into and through the apertures of the endless oleophilic belt. A thick layer of mineral containing oil phase hangs onto the belt surfaces which is conveyed up and away from the drum wall by the revolving steel belt. After the belt surfaces are conveyed away from the drum wall, the bitumen, heavy minerals, silt and clay containing oil phase mixture is stripped from the belt surfaces with the use of jets of steam. A total liquid flow of 24.2 tonnes per hour of oil phase is produced in the steam strip zone above the drum. It has a composition of 26% bitumen, 1.2% heavy mineral matter, 0.4% carbonaceous matter and 6.1% mineral matter in the form of silt and clay with the remaining 66.3% being water. This stripped off liquid stream is mixed with an equal amount of cold water at about 10 C. and is reprocessed through a second drum, identical to the first drum, to remove a portion of the silt and clay. The aqueous phase from the second drum is recycled to the inlet of the first drum. The bitumen and heavy minerals product recovered from the second drum and belt is further refined. With the second drum steam rollers are used to remove the bitumen product from the belt. This is done to reduce the water content of the final bitumen product.

This two stage separation method of sludge produces per hour a mixture that contains 6 tonnes of bitumen, 0.3 tonnes of heavy mineral material, 0.1 tonnes of carbonaceous material and 0.2 tonnes of lighter mineral matter and varying amounts of water. This mixture is then diluted with naphtha and centrifuged to remove minerals from the bitumen. The minerals containing material is dried and ashed to remove the water, carbonaceous material, residual bitumen and naphtha, and then the minerals are separated by means of magnetic attraction and high tension separation. This method is used to recover bitumen and/or a heavy mineral extract from tailings pond sludge and does not require the separate addition of oil phase. The use of a second stage permits a convenient method for washing the product with water to upgrade it through removing additional unwanted hydrophilic gangue materials.

If the process were to be used to recover minerals from a source not containing oil phase, the oil phase would have to be added separately as shown in the following examples.

EXAMPLE II

A dried up river bed, containing 0.1 ounce of flour gold per tonne of sand, silt and clay is to be separated to recover the gold. An aqueous slurry is prepared by adding 3 tonnes of water to each tonne of dried up river bed material and this slurry mixture is then screened through a 297 mesh screen to remove oversize materials. The screened slurry is then pumped into the below described drum at the rate of 20 tonnes per hour. The drum is as illustrated in FIGS. 1 and 2 and is 3 meters long, 1.2 meters in diameter and is divided into four equal lateral compartments by three baffles made of perforated steel plate. Each baffle is 3.1 mm. thick and contains 6.4 mm. round perforations. Each compartment contains a charge of oleophilic balls, 25.4 mm. in diameter, such as to fill the compartment about 60% full. The screened slurry enters the drum at the rear into the first compartment through a pipe and a rotary seal and flows toward an oleophilic apertured sieve wall outlet forming the last compartment at the front of the drum. The drum is supported by bearings and is driven by a gear motor and belt drive to rotate at about 1 rpm. Twenty pounds of petroleum jelly per tonne of mixture is added to the slurry entering the drum. The mixture flowing through the drum is at a temperature of about 20° C. The oleophilic apertured outlet compartment is a cylindrical section 0.61 meters long, made from perforated steel, 3.1 mm. thick and having 4.7 mm. round holes. The drum rotates in a counter clockwise direction, and a scraper, as illustrated in FIG. 6, is located on the outside of the oleophilic apertured drum section at about the 2 o'clock position. Aqueous phase leaves the drum near the bottom in quadrant III and falls into a hopper. No appreciable amounts of petroleum jelly are noted on the liquid in the hopper. This aqueous phase from the hopper is removed to a drainage pond so that a portion of the water can be recycled back to the drum. Petroleum jelly and associated minerals are scraped from the outside of the apertured wall and are heated to permit the minerals to settle and be recovered while the petroleum jelly is returned back to the drum inlet for reuse. Approximately 0.4 ounces of flour gold are recovered per hour from the petroleum jelly scraped off the apertured drum wall.

EXAMPLE III

Diamonds are found in soil and rock called kimberlite in large vertical lava channels called diamond pipes. Kimberlite is crushed and then sieved on a 3 mm. sieve. Since diamonds are very hard, they are not easily damaged by crushing. the oversize material is examined manually for diamonds, which are removed, and then the oversize kimberlite is returned for further crushing. The undersize kimberlite is mixed with water to produce a slurry mixture containing by weight between 10 and 60% kimberlite and between 40 and 90% water. The slurry is then introduced at the center into an apparatus similar to that shown in FIG. 8. Each concentric drum compartment is filled about 55% full with 13 mm. oleophilic steel balls and consist of three concentric compartments separated by concentric apertured baffles. Refined petroleum jelly is added continuously to the mixture entering the drum in proportion of 0.05% by weight of the kimberlite in the slurry. The drum, being about 200 cm. in diameter and 60 cm in length, is mounted on an 8 cm. O.D., 6 cm. I.D. hollow shaft in bearings. A sprocket and chain drive coupled to a hydraulic motor are used to cause the drum to turn at about 5 rpm. Apertures in the outer cylindrical wall of the drum are circular holes 3 mm. in diameter on 5 mm. staggered centers. The drum wall is 3 mm. thick. A bath hopper is mounted under the drum to collect gangue for disposal. The drum is operated without an oleophilic belt and instead, contains scraper means.

During operation, crushed kimberlite is continuously blended with water and pumped into the rotating drum at a rate of 5.0 tonnes of kimberlite per hour. This mixture tumbles with the oleophilic free bodies and with the petroleum jelly until it passes through the drum wall apertures. Kimberlite gangue and water pass through the sieve apertures and fall away from the drum wall. Diamonds present in the slurry become coated with petroleum jelly and are captured by the jelly coated apertured wall and are carried by this wall until scraped off the outside by a scraper blade. The scraped off jelly containing the diamonds and other mineral particles are thrown into hot water where the diamonds and mineral particles sink to the bottom and the petroleum jelly floats. The diamonds are recovered, dried and packaged and the petroleum jelly adhesive is floated off the water, cleaned and reused in the process.

While the above specification describes the invention in terms of its best known embodiments, other undisclosed embodiments and applications will become obvious to one skilled in the art from this disclosure. Therefore, the invention is not to be limited solely to the disclosed embodiments, but is to be accorded the full scope of the appended claims. For example, it is considered well within the scope of the invention to make the diameter of a lateral outlet or separation compartment larger than the diameter of the other lateral compartments of the drum. Also, the level of free bodies in the outlet compartment may differ from the level of free bodies in the other compartments if this will improve the separation of a given mixture. Similarly, squeezed or scraped rollers may be used in the place of scrapers or endless belts as the oil phase removal means if this is beneficial or reduces abrasion of the sieve wall for certain oil and water phase mixtures.

I claim:

1. A method for the continuous separation and removal of oil phase from an aqueous phase and oil phase mixture which comprises,
    (a) providing a continuous separation and recovery system comprising a generally horizontal rotatable drum, the interior of which is defined by a rear endwall, a front endwall and a cylindrical sidewall interconnecting said front and rear endwalls, said drum being divided into two or more successive compartments by means of one or more oleophilic apertured baffle plates positioned within said drum, each of said compartments containing oleophilic surfaced free bodies having an external size which is larger than the apertures in said baffle plates, said free bodies having a bulk density greater than the density of water, the first of said compartments in the direction of mixture flow being the feed compartment containing means for introducing the mixture to be processed therein, the last of said compartments in the direction of mixture flow being the discharge compartment in which a wall thereof has a plurality of apertures spaced therein, said apertures in the wall of such discharge compartment being smaller in size that the free bodies contained therein, said apertured wall of such discharge compartment further having interior oleophilic surfaces, said system further having means to rotate said drum;

(b) continuously introducing said aqueous and oil phase mixture into said feed compartment while said drum is rotating and continuously tumbling said mixture in the presence of said oleophilic free bodies causing, in each compartment, said oil phase to adhere to and coat the oleophilic surfaces contained therein such that the velocity of travel of oil phase through each of said compartments is slowed relative to the velocity of travel of aqueous phase resulting in an in situ buildup of oil phase in each compartment by oil phase adhering to the oleophilic surfaces in each compartment and accumulating between the voids of said free bodies, (c) continuously withdrawing said aqueous phase from said discharge compartment through the apertures contained in the apertured wall thereof in a lower area of drum rotation where the concentration of free bodies is minimal and causing said oil phase to rotate away from the area of aqueous phase removal in the direction of drum rotation and migrate toward and adhere to the interior oleophilic surface of said wall in the area of drum rotation where the concentration of free bodies is greatest and be extruded through said apertures in said discharge compartment by the force of the tumbling free bodies and the flow of said aqueous phase, and (d) removing said oil phase from the outer surface of said apertured wall.

2. A method according to claim 1 wherein the wall of said discharge compartment containing a plurality of apertures is the cylindrical wall portion of said compartment.

3. A method according to claim 2 wherein said oleophilic free bodies have a diameter of between about 5 and 200 millimeters and a specific gravity of between about 1.0 and 8.5.

4. A method according to claim 3 wherein the apertures in said baffles and in said apertured wall are between about 2 and 150 millimeters in width.

5. A method according to claim 4 wherein said drum is divided into at least three compartments by at least two baffles.

6. A method according to claim 4 wherein said oleophilic free bodies are in the form of balls.

7. A method according to claim 4 wherein said baffles contain apertures over the entire surface thereof.

8. A method according to claim 4 wherein only part of the surface area of said baffles contain apertures therein.

9. A method according to claim 8 wherein said baffles are arranged such that the apertured areas of adjacent baffles are not in alignment with each other.

10. A method according to claim 9 wherein said baffles are arranged such that the apertured areas of adjacent baffles are approximately 180 degrees out of phase with each other.

11. A method according to claim 4 wherein the flow of mixture through said drum is in an axial direction, with said drum being divided into lateral compartments by laterally located baffles and wherein said inlet means is contained in the rear endwall of said drum.

12. A method according to claim 4 wherein the flow of mixture through said drum is in a radial direction, with said drum being divided into concentric compartments by cylindrical concentrically located baffles and wherein said inlet means in a hollow apertured tube extending along the axis of said drum and said apertured wall forming part of the discharge compartment is the cylindrical drum wall.

13. A method according to claim 4 wherein the outer apertured surface of said cylindrical sidewall forming said discharge compartment is oleophilic and wherein the oil phase extruded through said apertures adheres thereto and is removed from said outer surface by scraping means.

14. A method according to claim 4 wherein a revolving oleophilic apertured endless belt partially enwraps the lower portion of the outer apertured surface of the discharge compartment of said drum and wherein the oil phase extruded through the apertures in said discharge compartment is removed from the outer surface thereof by means of said oleophilic endless belt.

15. A method according to claim 14 wherein said endless belt is a open weave mesh belt.

16. A method according to claim 15 wherein said mesh belt is made from momofilament plastic fibres.

17. A method according to claim 15 wherein said mesh belt is made from metal.

18. A method according to claim 17 wherein said metal belt is made from a member consisting of steel or steel alloy and consists of longitudinal multistrand wire cables intersected at right angles by cross wires.

19. A method according to claim 18 wherein said cross wires of said belt are rods having indentations on top and bottom surfaces for accepting the longitudinal cables, said indentations being spaced sufficiently to prevent bunching of said rods along the length of the belt, said rods having protective wear surfaces that protrude beyond the longitudinal cables of the belt.

20. A method according to claim 14 wherein said endless belt is a metal belt constructed from adjoining flattened metal coils joined by cross rods.

21. A method according to claim 20 wherein said metal belt is made from a member consisting of steel or steel alloy.

22. A method according to claim 4 wherein said oil phase has a viscosity of at least 100 poises.

23. A method according to claim 22 wherein said aqueous phase oil phase mixture is from a commerical tar sands processing operation.

24. A method according to claim 22 wherein said aqueous phase oil phase mixture is a mined tar sand slurried with water.

25. A method according to claim 22 wherein said aqueous phase oil phase mixture contains oleophilic surfaced mineral particles to which an oil phase has been added.

26. A method according to claim 22 wherein said aqueous phase oil phase mixture is formed from a stream of oil phase containing hydrophilic minerals to which aqueous phase has been added.

27. A method according to claim 4 wherein said oil phase is removed from the outer surface of said apertured wall by the flow of the withdrawing aqueous phase and is aerated as it is removed from said wall and by falling through the surrounding air into a receptacle also containing aqueous phase withdrawn through said apertured wall, allowing said aerated oil phase to remain in said receptacle until it rises to the surface and floats on said aqueous phase, and recovering said aerated oil phase from the surface of said aqueous phase in said receptacle by skimming.

28. A method for the continuous separation and removal of oil phase from an aqueous phase and oil phase mixture which comprises,
  (a) providing a continuous separation and recovery system comprising a generally horizontal rotatable drum, the interior of which is defined by a rear endwall, a front endwall and a cylindrical sidewall having an oleophilic inner surface interconnecting said front and rear endwalls, at least a portion of said cylindrical sidewall containing apertures, said drum containing oleophilic surfaced free bodies having an external size which is larger than the apertures in said cylindrical sidewall, said free bodies having a bulk density greater than the density of water, said rear wall containing inlet means for introducing mixture into said drum, said system further having means to rotate said drum;
  (b) continuously introducing said aqueous and oil phase mixture through said inlet means into said drum while said drum is rotating and continuously tumbling said mixture in the presence of said oleophilic free bodies causing said oil phase to adhere to and coat the oleophilic surfaces contained therein such that the velocity of travel of oil phase through said drum is slowed relative to the velocity of travel of aqueous phase resulting in an in situ buildup of oil phase in said drum by oil phase adhering to the oleophilic interior surfaces thereof and accumulating between the voids of said free bodies,
  (c) continuously withdrawing said aqueous phase through the apertures contained in the sidewall thereof in a lower area of drum rotation where the concentration of free bodies is minimal and causing said oil phase to rotate away from the area of aqueous phase removal in the direction of drum rotation and migrate toward and adhere to the interior oleophilic surface of said wall in the area of drum rotation where the concentration of free bodies is greatest and be extruded through said sidewall apertures by the force of the tumbling free bodies and the flow of said aqueous phase, and
  (d) removing said oil phase from the outer surface of said apertured wall.

29. A method according to claim 28 wherein said oleophilic free bodies have a diameter of between about 5 and 200 millimeters and a specific gravity of between about 1.0 and 8.5.

30. A method according to claim 29 wherein the apertures in said sidewall are between about 2 and 150 millimeters in width.

31. A method according to claim 30 wherein said oleophilic free bodies are in the form of balls.

32. A method according to claim 30 wherein the outer apertured surface of said cylindrical sidewall forming said discharge compartment is oleophilic and wherein the oil phase extruded through said apertures adheres thereto and is removed from said outer surface by scraping means.

33. A method according to claim 30 wherein a revolving oleophilic apertured endless belt partially enwraps the lower portion of the outer apertured surface of the discharge compartment of said drum and wherein the oil phase extruded through the apertures in said discharge compartment is removed from the outer surface thereof by means of said oleophilic endless belt.

34. A method according to claim 33 wherein said endless belt is a open weave mesh belt.

35. A method according to claim 34 wherein said mesh belt is made from momofilament plastic fibres.

36. A method according to claim 34 wherein said mesh belt is made from metal.

37. A method according to claim 36 wherein said metal belt is made from a member consisting of steel or steel alloy and consists of longitudinal multistrand wire cables intersected at right angles by cross wires.

38. A method according to claim 37 wherein said cross wires of said belt are rods having indentations on top and bottom surfaces for accepting the longitudinal cables, said indentations being spaced sufficiently to prevent bunching of said rods along the length of the belt, said rods having protective wear surfaces that protrude beyond the longitudinal cables of the belt.

39. A method according to claim 33 wherein said endless belt is a metal belt constructed from adjoining flattened metal coils joined by cross rods.

40. A method according to claim 39 wherein said metal belt is made from a member consisting of steel or steel alloy.

41. A method according to claim 30 wherein said oil phase has a viscosity of at least 100 poises.

42. A method according to claim 41 wherein said aqueous phase oil phase mixture is from a commerical tar sands processing operation.

43. A method according to claim 41 wherein said aqueous phase oil phase mixture is a mined tar sand slurried with water.

44. A method according to claim 41 wherein said aqueous phase oil phase mixture contains oleophilic surfaced mineral particles to which an oil phase has been added.

45. A method according to claim 41 wherein said aqueous phase oil phase mixture is formed from a stream of oil phase containing hydrophilic minerals to which aqueous phase has been added.

46. A method according to claim 30 wherein said oil phase is removed from the outer surface of said apertured wall by the flow of the withdrawing aqueous phase and is aerated as it is removed from said wall and by falling through the surrounding air into a receptacle also containing aqueous phase withdrawn through said apertured wall, allowing said aerated oil phase to remain in said receptacle until it rises to the surface and floats on said aqueous phase, and recovering said aerated oil phase from the surface of said aqueous phase in said receptacle by skimming.

47. An apparatus for the continuous separation and removal of oil phase from an aqueous phase and oil phase mixture consisting of,
  (a) a generally horizontal rotatable drum the interior of which is defined by a rear endwall, a front endwall and a cylindrical sidewall interconnecting said front and rear endwalls, said drum being divided into two or more successive compartments by means of one or more oleophilic apertured baffle plates positioned within said drum, each of said compartments containing oleophilic surfaced free bodies having an external size which is larger than the apertures in said baffle plates, said free bodies having a bulk density greater than the density of water, the first of said compartments in the direction of mixture flow being the feed compartment containing inlet means for introducing the mixture to be processed therein, the last of said compartments in the direction of mixture flow being the discharge compartment in which a wall thereof has a plurality of apertures spaced therein, said apertures in the wall of such discharge compartment being smaller in size that the free bodies contained therein, said apertured wall of such discharge compartment further having interior oleophilic surfaces, (b) oil removal means in contact with or adjacent to at least a portion of said apertured wall, and (c) means to rotate said drum.

48. An apparatus according to claim 47 wherein the wall of said discharge compartment containing a plurality of apertures is the cylindrical wall portion of said compartment.

49. An apparatus according to claim 48 wherein said oleophilic free bodies have a diameter of between about 5 and 200 millimeters and a specific gravity of between about 1.0 and 8.5.

50. An apparatus according to claim 49 wherein the apertures in said baffles and in said apertured wall are between about 2 and 150 millimeters in width.

51. An apparatus according to claim 50 wherein said drum is divided into at least three compartments by at least two baffles.

52. An apparatus according to claim 50 wherein said oleophilic free bodies are in the form of balls.

53. An apparatus according to claim 50 wherein said baffles contain apertures over the entire surface thereof.

54. An apparatus according to claim 50 wherein only part of the surface area of said baffles contain apertures therein.

55. An apparatus according to claim 54 wherein said baffles are arranged such that the apertured areas of adjacent baffles are not in alignment with each other.

56. An apparatus according to claim 55 wherein said baffles are arranged such that the apertured areas of adjacent baffles are approximately 180 degrees out of phase with each other.

57. An apparatus according to claim 50 wherein the flow of mixture through said drum is in an axial direction, with said drum being divided into lateral compartments by laterally located baffles and wherein said inlet means is contained in the rear endwall of said drum.

58. An apparatus according to claim 50 wherein the flow of mixture through said drum is in a radial direction, with said drum being divided into concentric compartments by cylindrical concentrically located baffles and wherein said inlet means in a hollow apertured tube extending along the axis of said drum and said apertured wall forming part of the discharge compartment is the cylindrical drum wall.

59. An apparatus according to claim 50 wherein the outer apertured surface of said cylindrical sidewall forming said discharge compartment is oleophilic and wherein the oil phase removal means is scraping means located adjacent the outside of said cylindrical sidewall.

60. An apparatus according to claim 50 wherein the oil phase removal means comprises a revolving oleophilic apertured endless belt partially enwraped about the lower portion of the outer apertured surface of the discharge compartment of said drum.

61. An apparatus according to claim 60 wherein said endless belt is a open weave mesh belt.

62. An apparatus according to claim 61 wherein said mesh belt is made from momofilament plastic fibres.

63. An apparatus according to claim 61 wherein said mesh belt is made from metal.

64. An apparatus according to claim 63 wherein said metal belt is made from a member consisting of steel or steel alloy and consists of longitudinal multistrand wire cables intersected at right angles by cross wires.

65. An apparatus according to claim 64 wherein said cross wires of said belt are rods having indentations on top and bottom surfaces for accepting the longitudinal cables, said indentations being spaced sufficiently to prevent bunching of said rods along the length of the belt, said rods having protective wear surfaces that protrude beyond the longitudinal cables of the belt.

66. An apparatus according to claim 60 wherein said endless belt is a metal belt constructed from adjoining flattened metal coils joined by cross rods.

67. An apparatus according to claim 66 wherein said metal belt is made from a member consisting of steel or steel alloy.

68. An apparatus for the continuous separation and removal of oil phase from an aqueous phase and oil phase mixture consisting of, (a) a generally horizontal rotatable drum the interior of which is defined by a rear endwall, a front endwall and a cylindrical sidewall having an oleophilic inner surface-interconnecting said front and rear endwalls, said drum containing oleophilic surfaced free bodies having an external size which is larger than the apertures in said cylidrical sidewall, said free bodies having a bulk density greater than the density of water, said rear wall containing means for introducing the mixture to be processed therein, (b) oil removal means in contact with or adjacent to at least a portion of said apertured wall, and (c) means to rotate said drum.

69. An apparatus according to claim 68 wherein said oleophilic free bodies have a diameter of between about 5 and 200 millimeters and a specific gravity of between about 1.0 and 8.5.

70. An apparatus according to claim 69 wherein the apertures in said apertured wall are between about 2 and 150 millimeters in width.

71. An apparatus according to claim 70 wherein said oleophilic free bodies are in the form of balls.

72. An apparatus according to claim 70 wherein the outer apertured surface of said cylindrical sidewall forming is oleophilic and wherein the oil phase removal means is scraping means located adjacent the outside of said cylindrical sidewall.

73. An apparatus according to claim 70 wherein the oil phase removal means comprises a revolving oleophilic apertured endless belt partially enwrapped about the lower portion of the outer apertured surface of the discharge compartment of said drum.

74. An apparatus according to claim 73 wherein said endless belt is a open weave mesh belt.

75. An apparatus according to claim 74 wherein said mesh belt is made from momofilament plastic fibres.

76. An apparatus according to claim 74 wherein said mesh belt is made from metal.

77. An apparatus according to claim 76 wherein said metal belt is made from a member consisting of steel or steel alloy and consists of longitudinal multistrand wire cables intersected at right angles by cross wires.

78. An apparatus according to claim 77 wherein said cross wires of said belt are rods having indentations on top and bottom surfaces for accepting the longitudinal cables, said indentations being spaced sufficiently to prevent bunching of said rods along the lenght of the belt, said rods having protective wear surfaces that protrude beyond the longitudinal cables of the belt.

79. An apparatus according to claim 73 wherein said endless belt is a metal belt constructed from adjoining flattened metal coils joined by cross rods.

80. An apparatus according to claim 79 wherein said metal belt is made from a member consiting of steel or steel alloy.

* * * * *